UNITED STATES PATENT OFFICE.

JOHN MEYENBERG, OF HIGHLAND, ILLINOIS.

PROCESS OF PRESERVING MILK.

SPECIFICATION forming part of Letters Patent No. 358,213, dated February 22, 1887.

Application filed June 12, 1886. Serial No. 204,987. (No specimens.)

*To all whom it may concern:*

Be it known that I, JOHN MEYENBERG, of Highland, in the county of Madison and State of Illinois, have invented certain new and useful Improvements in Processes of Preserving Milk, of which the following is a specification.

This invention relates to an improved process of preserving milk after the same has been condensed *in vacuo* and canned; and the invention consists of the process herein described of preserving milk after condensing the same *in vacuo* and canning the same by subjecting the cans in a hermetically-closed chamber to a vacuum by exhausting the air, then subjecting them to an air-pressure of about two atmospheres, next heating the air in the chamber by admitting steam to a temperature not exceeding 235° Fahrenheit while rotating the cans, and finally quickly cooling the same.

Heretofore milk was subjected to a much higher temperature than I use. In the process used heretofore the milk was boiled a considerable length of time in the open air until it was reduced about one-sixth of its volume. It was then cooled slowly to about 100° Fahrenheit and then brought into the vacuum-pan. This process requires much time, gives the milk a yellowish color and a peculiar taste. For preserving the milk it has been customary heretofore to use hot water, in which the milk-cans were placed and heated, and also by which the milk was heated to about 240° Fahrenheit, kept at this temperature for about twenty minutes, and agitated.

In carrying out my invention, the milk in its fresh state is boiled and condensed *in vacuo* to a suitable consistency. The milk is then slowly cooled and placed into cans of larger or smaller size, as required by the trade, which cans are then hermetically sealed in the usual manner. They are next placed into a drum to which rotary motion can be imparted, which drum is located in a hermetically-closed chamber. This chamber is connected to an air-pump of simple construction, which can be used as a suction and force pump, and the same worked as a suction-pump until a vacuum of about two atmospheres is established in the chamber. The cans are subjected to this pressure for some time for the purpose of testing them as to their being properly closed. Any leaking cans are removed, so that only hermetically-closed cans are subjected to the process. The air-cock of the chamber is then opened and air forced into the chamber by the air-pump until a pressure of about two atmospheres is produced in the same. This pressure also serves for testing the tightness of the cans, as by the exterior pressure any imperfectly-closed or leaking cans can be readily discovered and removed. The air in the chamber is then slowly heated by admitting a sufficient quantity of steam into the same until a temperature of about 230° to 235° Fahrenheit is obtained in the chamber, care being taken that this temperature of 235° Fahrenheit is not exceeded. While exposed to this temperature the cans are rotated by the drum and exposed to said temperature for about twenty-five to thirty minutes, after which they are quickly cooled by admitting water or other cooling medium.

By the thorough testing of the cans, which is accomplished by exposing the same first to a vacuum and then to an air-pressure of two atmospheres, they are fully tested as to their tightness. Any imperfectly-sealed cans are excluded from further treatment and carefully sealed, so as to be subjected to the vacuum and air-pressure with the next set of cans. The temperature of 235° Fahrenheit, to which the cans are exposed, is sufficient to destroy the fermenting germs contained in the same, while the milk is not burned and spoiled, which would be the case if a higher temperature than 235° Fahrenheit would be employed. By this temperature no "burned" taste is imparted to the milk, and the original color, smell, and taste of the same retained. Milk thus condensed without sugar can be preserved for any length of time and shipped to any climate without undergoing any change in color and quantity.

Having thus described my invention, I claim as new and desire to secure by Letters Patent—

The process herein described of preserving milk after the same has been condensed *in vacuo*, which consists in subjecting the cans in a hermetically-closed chamber to a vacuum of about two atmospheres pressure; secondly, subjecting them to an air-pressure of about two atmospheres; thirdly, heating the air in the chamber to a temperature not exceeding 235° Fahrenheit while continually rotating the cans, and, finally, quickly cooling the milk, substantially as set forth.

In testimony that I claim the foregoing as my invention I have signed my name in presence of two subscribing witnesses.

JOHN MEYENBERG.

Witnesses:
JULES A. ROHR,
BERNART SIDLER.